(12) United States Patent
Xie et al.

(10) Patent No.: US 10,762,345 B2
(45) Date of Patent: Sep. 1, 2020

(54) METHOD AND DEVICE FOR ACQUIRING TEXT DATA FROM TRADEMARK IMAGE, COMPUTER DEVICE AND STORAGE MEDIUM

(71) Applicant: BAIDU ONLINE NETWORK TECHNOLOGY (BEIJING) CO., LTD., Beijing (CN)

(72) Inventors: Shufu Xie, Beijing (CN); Yuning Du, Beijing (CN); Guang Li, Beijing (CN); Shanshan Liu, Beijing (CN); Chenxia Li, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 168 days.

(21) Appl. No.: 16/032,486

(22) Filed: Jul. 11, 2018

(65) Prior Publication Data
US 2019/0065841 A1   Feb. 28, 2019

(30) Foreign Application Priority Data

Aug. 25, 2017  (CN) .......................... 2017 1 0743642

(51) Int. Cl.
*G06K 9/00* (2006.01)
*G06F 16/583* (2019.01)
(Continued)

(52) U.S. Cl.
CPC ..... *G06K 9/00456* (2013.01); *G06F 16/5846* (2019.01); *G06K 9/325* (2013.01);
(Continued)

(58) Field of Classification Search
None
See application file for complete search history.

(56) References Cited

U.S. PATENT DOCUMENTS

| | | | |
|---|---|---|---|
| 5,933,524 A * | 8/1999 | Schuster | G06T 7/194 358/522 |
| 6,173,077 B1 * | 1/2001 | Trew | H04N 19/51 382/236 |

(Continued)

FOREIGN PATENT DOCUMENTS

| | | |
|---|---|---|
| CN | 103489008 | 1/2014 |
| CN | 104462380 | 3/2015 |
| KR | 19990051743 | 7/1999 |

OTHER PUBLICATIONS

SIPO, First Office Action for CN Application No. 201710743642.4, dated Mar. 12, 2020.

*Primary Examiner* — Mohammed Rachedine
(74) *Attorney, Agent, or Firm* — Hodgson Russ LLP (57) ABSTRACT

The present disclosure provides a method and for acquiring text data of a trademark image, a computer device and a non-transitory computer readable storage medium. The method includes the followings. A trademark database including one or more mappings among trademark feature information, trademark description information and trademark text information is established. A to-be-processed image including image description information is acquired. Trademark feature information corresponding to the to-be-processed image is determined. The trademark text information corresponding to the trademark feature information as the text data of the trademark image corresponding to the to-be-processed image according to the one or more mappings in the trademark database when the trademark description information corresponding to the trademark feature information corresponding to the to-be-processed image is contained in the image description information corresponding to the to-be-processed image.

17 Claims, 7 Drawing Sheets

(51) Int. Cl.
*G06K 9/62* (2006.01)
*G06K 9/32* (2006.01)

(52) U.S. Cl.
CPC ....... *G06K 9/6256* (2013.01); *G06K 2209/25* (2013.01); *G06K 2209/27* (2013.01)

(56) References Cited

U.S. PATENT DOCUMENTS

| | | | | |
|---|---|---|---|---|
| 6,473,522 | B1* | 10/2002 | Lienhart | G06K 9/325 382/164 |
| 2010/0217963 | A1* | 8/2010 | Peterson | G06F 9/445 713/2 |
| 2011/0013843 | A1* | 1/2011 | Seeber | G06F 16/5838 382/190 |

* cited by examiner

| trademark category | trademark name | trademark text content |
|---|---|---|
| 63161 | Zhi Xiu Tang Care | Zhi Xiu Tang |
| 9304 | Bei Xue Yu Ren | Beixiren |
| 72016 | CAE | CAE Bathroom |
| 20098 | Tudou | Tudou |
| 64505 | CiFengTang | CiFengTang |
| 35247 | Gui An | Gui An |
| 8532 | Lego | LEGO |
| 43934 | Xindaze | Xindaze |
| 2514 | Haoli | Haoli |
| 15451 | Duolian | Duolian |
| 29491 | Qianbaidu | C. banner |
| 18129 | Mingdian Shoes | Mingdian |
| 9099 | Sapphire | SAPPHIRE |
| 30892 | Geshile | Geshile |
| 17482 | Smetana | Smetana |
| 123 | Tiger | Null |
| 321 | Zojirushi | Null |
| 1122 | Audi | Null |

METHOD AND DEVICE FOR ACQUIRING TEXT DATA FROM TRADEMARK IMAGE, COMPUTER DEVICE AND STORAGE MEDIUM

CROSS-REFERENCE TO RELATED APPLICATION

This application claims priority to and benefits of Chinese Patent Application Serial No. 201710743642.4, filed with the State Intellectual Property Office of P. R. China on Aug. 25, 2017, the entire content of which is incorporated herein by reference.

TECHNICAL FIELD

The present disclosure relates to the field of image processing technology, and more particularly, to technology of acquiring text data of a trademark image.

BACKGROUND

Deep-learning based methods have achieved far more effects than conventional methods in various fields, such as face recognition, OCR (optical character recognition), video classification or the like, and thus has been attacked wide attention from industry and academia. In terms of the deep-learning based method, training data plays a virtually important role.

SUMMARY

According to embodiments of the present disclosure, a method for acquiring text data of a trademark image is provided. The method includes:

x, establishing a trademark database, wherein the trademark database includes one or more mappings among trademark feature information, trademark description information and trademark text information;

in which the method further includes:

a, acquiring a to-be-processed image, the to-be-processed image including image description information;

b, determining trademark feature information corresponding to the to-be-processed image; and c, according to the one or more mappings in the trademark database, when trademark description information corresponding to the trademark feature information corresponding to the to-be-processed image is contained in the image description information, determining trademark text information corresponding to the trademark feature information corresponding to the to-be-processed image as text data of the trademark image corresponding to the to-be-processed image.

According to the present disclosure, a computer device is provided. The computer device includes one or more processors and a memory configured to store one or more computer programs. When the one or more computer programs are executed by the one or more processors, the above method is executed by the one or more processors.

According to the present disclosure, a non-transitory computer readable storage medium is also provided. The non-transitory computer readable storage medium stores computer codes. When the computer codes are executed, the above method is executed.

BRIEF DESCRIPTION OF THE DRAWINGS

Other features, objectives, and advantages of the present disclosure will become more apparent by reading following detailed description made to non-limiting embodiments with reference to the following drawings:

FIG. 11 illustrates an exemplary diagram of acquired text data corresponding to a trademark image after FIG. 10 is identified according to another exemplary embodiment of the present disclosure.

Same or similar reference numerals throughout the drawings represent same or similar elements.

DETAILED DESCRIPTION

Before discussing the exemplary embodiments in more detail, it should be mentioned that some exemplary embodiments are described as a process or method depicted as a flow chart. Although the flow charts describe the operations as sequential processes, some operations may be implemented in parallel, concurrently or simultaneously. In addition, the order of operations can be rearranged. The processing may be terminated when its operations are completed, but it may also have additional steps excluded in the drawings. The processing may correspond to methods, functions, procedures, subroutines, subroutines, and the like.

The term "processing device" in this context refers to a "computer device", also referred to as a "computer", which refers to a smart electronic device that can perform predetermined processing such as numerical calculation and/or logical calculation by running predetermined programs or instructions, and can include a processor and a memory. The processor is configured to execute instructions stored in the memory to execute a predetermined processing, or the predetermined processing is performed by hardware such as an ASIC, an FPGA, or a DSP, or the predetermined processing may be realized by a combination thereof.

The computer device includes user equipment and/or a network device. The user equipment includes but is not limited to a computer, a smart phone, a PDA, and the like. The network device includes but is not limited to a single network server, a server group composed of multiple network servers, or a cloud constituted by a large number of computers or network servers based on cloud computing. The cloud computing is a type of distributed computing and is a super virtual computer consisted of a set of loosely coupled computers. The computer device can be separately operated to implement the present disclosure, and can also access the network to realize the present disclosure by interacting with other computer devices in the network. The network in which the computer device is located includes, but is not limited to, Internet, wide area network, metropolitan area network, local area network, VPN network, and the like.

Those skilled in the art should understand that in normal circumstances, the "processing device" described in the present disclosure may be only a network device, i.e., the network device performs corresponding operations. In special cases, the processing device may also be consisted by integrating user equipment and network devices or servers. That is, the user equipment cooperates with the network device to perform corresponding operations. For example, the user equipment sends instructions to the network device to instruct the network device to start performing operations related to "automatic acquisition of training data for image feature identification.

It should be noted that the user equipment, the network device, the network, and the like are only examples, and other existing or future possible computer devices or networks may be applicable to the present disclosure, and may also be included in the protection scope of the present disclosure, and incorporated here by reference.

Specific structural and functional details disclosed herein are merely representative and are for the purpose of describing exemplary embodiments of the present disclosure. However, the present disclosure may be embodied in many alternate forms and should not be construed as limited only to the embodiments set forth herein.

It will be understood that, although the terms "first," "second," etc. may be used herein to describe various elements, these elements should not be limited by these terms. These terms are used only to distinguish one unit from another. For example, a first unit may be referred to as a second unit, and similarly a second unit may be referred to as a first unit without departing from the scope of the exemplary embodiments. As used herein, the term "and/or" includes any and all combinations of one or more of the associated listed items.

Terms used herein is for the purpose of describing particular embodiments only and is not intended to limit the exemplary embodiments. As used herein, the singular forms "a," "an," may be intended to include the plural forms as well, unless otherwise explicitly indicated in the context. It should also be understood that the terms "including" and/or "comprising" as used herein define the presence of stated features, integers, steps, operations, units and/or components, without precluding the presence or addition of one or more other features, integers, steps, operations, units, components, and/or combinations thereof.

It should also be mentioned that in some alternative implementations, the mentioned functions/acts may occur in different orders than those indicated in the figures. For example, depending on involved functions/acts, two figures shown one after the other may actually be performed substantially simultaneously or sometimes in reverse order.

In related arts, training data for deep-learning based method may be obtained generally in following ways.

(1) The training data is obtained using a manual annotation method. That is, manually, on each of a set of to-be-annotated pictures, a target region and corresponding text data are annotated per picture. This method is long time consuming, has a low standard efficiency and costs a large amount of manpower.

(2) The training data is obtained using a semi-automation method by means of the OCR. For example, a result of text detection and identification performed on a to-be-annotated picture using the OCR is obtained, and manual correction is performed on the result. This method has a disadvantage in that: it depends on the identification effect of the OCR. When a target region is not included in the result of the OCR, it requires annotating the target region again. In addition, it still requires a manual inspection on an already obtained result, and thus cannot realize a fully automatic acquirement of the training data. In extreme cases, its efficiency may be even lower than that of the above manual annotation method.

Figure 5:
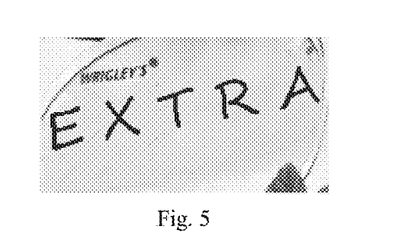
FIGS. 5 and 6 illustrate exemplary diagrams of a trademark image including text according to an exemplary embodiment of the present disclosure.
Figure 6:
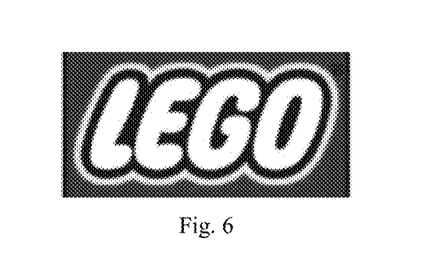

In addition, for some large-scaled Internet companies, users will upload a large amount of picture data to a server due to wide applications of their products. Taking a product search function by capturing pictures as an example, corresponding products may be automatically found according to a picture captured by the user and related information to the corresponding product is pushed to the user, which is quite convenience for the user. However, text and pattern designs are commonly included in a trademark of the product, as illustrated in FIGS. 5 and 6. For improving effect of the product search function by capturing pictures, some text features may be used to increase precision for product search, such as "EXTRA" included in the trademark of EXTRA gum. However, fonts of text included in the trademark are commonly particularly designed. Therefore, it is difficult to achieve a good identification effect on the text included in the trademark using deep-learning models based on traditional data training. As a result, how to effectively and automatically acquire the annotation information of this data in technical manners is a very valuable topic.

Embodiments of the present disclosure provide a method and a device for acquiring text data of a trademark image. Embodiments of the present disclosure will be described in more detail with reference to drawing.

Figure 1:
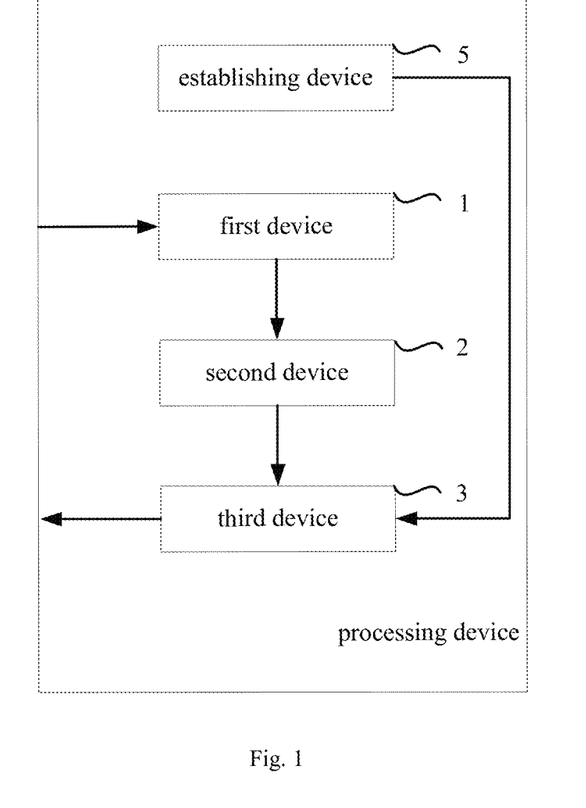
FIG. 1 illustrates a schematic diagram of a processing device for acquiring text data of a trademark image according to an aspect of the present disclosure.

FIG. 1 illustrates a schematic diagram of a processing device for acquiring text data of a trademark image according to an aspect of the present disclosure. The processing device includes an establishing device 5, a first device 1, a second device 2 and a third device 3.

In detail, the establishing device 5 is configured to establish a trademark database. The trademark database includes one or more mappings among trademark feature information, trademark description information and trademark text information corresponding to the trademark feature information. The first device 1 is configured to acquire a to-be-processed image. The to-be-processed image includes image description information. The second device 2 is configured to determine trademark feature information corresponding to the to-be-processed image. The third device 3 is configured to determine trademark text information corresponding to the trademark feature information corresponding to the to-be-processed image as text data of the trademark image corresponding to the to-be-processed image, when trademark description information corresponding to the trademark feature information corresponding to the to-be-processed image is contained in the image description information, according to the one or more mappings in the trademark database.

Compared with related arts, with embodiments of the present disclosure, according to the one or more mappings in the trademark database, when the trademark description information corresponding to the trademark feature information corresponding to the to-be-processed image is contained in the image description information corresponding to the to-be-processed image, the trademark text information corresponding to the trademark feature information is determined as the text data of the trademark image corresponding to the to-be-processed image, thereby realizing a method for automatically acquiring the text data of the trademark image. The present disclosure may accurately extract text included in the trademark from a product picture, and may quickly acquire a large amount of training data for a deep-learning model in a short term, thereby effectively improve identification efficiency and identification effect of the model.

Furthermore, the present disclosure may determine the image description information of the to-be-processed image from the page including the to-be-processed image or determine the image description information of the to-be-processed image according to similar images to the to-be-processed image, thereby providing various manners for acquiring the image description information, effectively and accurately acquiring the image description information, and realizing to fully automatically acquire the text data of the to-be-processed image.

Moreover, the present disclosure may determine the trademark image corresponding to the to-be-processed image and the text data corresponding to the trademark image as the training data. Further, the trademark image corresponding to the to-be-processed image and the text image corresponding to the trademark image may be determined as the training data only when the text data of the trademark image corresponding to the to-be-processed image is a nonempty set. Therefore, a high quality of training data may be automatically excavated, thereby realizing to strictly filter the training data, and effectively improving the identification efficiency and the identification effect of the model.

The establishing device 5 is configured to establish the trademark database. The trademark database includes one or more mappings among trademark feature information, trademark description information and trademark text information corresponding to the trademark feature information.

In detail, the establishing device 5 is configured to acquire one or more trademark images set in advance in a direct acquisition manner or in an interactive manner with another third-party database, and to acquire the trademark description information and the trademark text information corresponding to the trademark image. In addition, the establishing device 5 is configured to perform an image feature analysis on the trademark image to obtain the trademark feature information corresponding to the trademark image.

The trademark feature information may directly correspond to a group of image feature data, such as image vectors and the like. The one or more mappings included in the trademark database are thus among "trademark feature information (image feature data), trademark description information, trademark text information". The trademark feature information may also be correspondences between a group of image feature data and image feature ID (or called as trademark category). The image feature ID may be subsequently stored in the trademark database. That is, the one or more mappings included in the trademark database are among "trademark feature information (image feature ID, corresponding to the image feature data), trademark description information, trademark text information", for convenience of subsequently searching.

The image feature information includes, but is not limited to, color feature, textural feature, shape feature, spatial relation feature and the like.

The trademark description information refers to descriptions made to the trademark, including but not limited to, trademark name, company corresponding to the trademark, product corresponding to the trademark and the like. The trademark text information refers to text on the trademark image.

FIG. 6 illustrates a trademark image. As can be seen with reference to data illustrated in FIG. 10, the trademark category corresponding to the trademark feature information of the trademark image is 8532 (i.e., image feature ID), corresponding trademark name is "Lego", and corresponding trademark text information is "LEGO".

Figure 7:
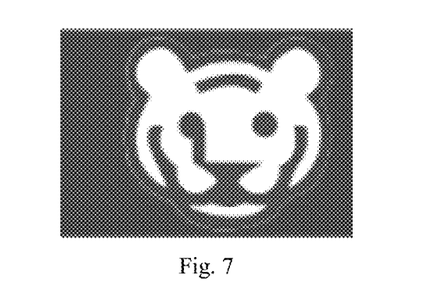
FIGS. 7 and 8 illustrate schematic diagrams of a trademark image excluding text according to an exemplary embodiment of the present disclosure.

FIG. 7 illustrated another trademark image. As can be seen with reference to data illustrated in FIG. 10, the trademark category corresponding to the trademark feature information of the trademark image is 123 (i.e., image feature ID), corresponding trademark name is "Tiger", and corresponding trademark text information is "NULL". "NULL" indicates that no trademark text information is contained in the trademark image.

For example, the establishing device 5 is configured to acquire an image of registered trademark by crawling a website of National Trademark Office, and perform image feature analysis on the image to obtain the image feature information corresponding to the trademark image. The trademark name corresponding to the trademark image is determined as the trademark description information corresponding to the trademark feature information. The text included on the trademark image is determined as the trademark text information. The trademark text information may be manually added, or may be added with correction and confirmation after the image is identified. Therefore, the trademark database is established by the establishing device 5.

The first device 1 is configured to acquire one or more to-be-processed images. The to-be-processed image includes image description information.

In detail, the first device 1 is configured to directly interact with a user device, to acquire several images uploaded via the user device. The several images uploaded are determined as the to-be-processed images. Alternatively, the first device 1 is configured to interact with an existing image database to acquire several images from the existing image database. The several images acquired are determined as the to-be-processed images. Alternatively, the first device 1 may be configured to crawl various webpage on Internet to acquire images included on the webpage. The images acquired are determined as the to-be-processed images.

Herein, those skilled in the art may understand that, the above method for acquiring the to-be-processed images is merely exemplary, and is not used to limit the present disclosure. Any method that may acquire "an image" is applicable to the present disclosure, so as to determine the acquired image as the "to-be-processed image" described in the present disclosure.

Figure 11:
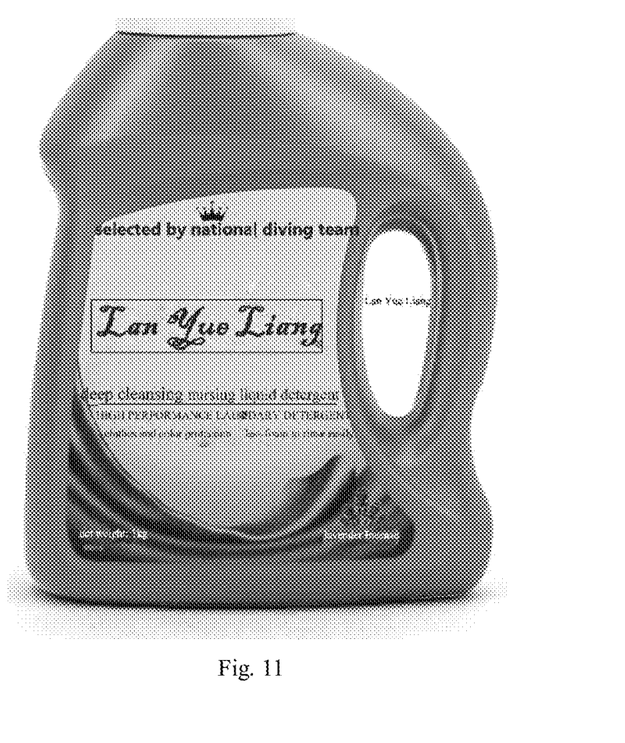

Herein, FIG. 11 illustrates an exemplary diagram of a to-be-processed image according to an exemplary embodiment of the present disclosure. The to-be-processed image may be uploaded by the user, or may be acquired from a database, or may be obtained by crawling a webpage on Internet.

The to-be-processed image may include the image description information in the image information. Alternatively, the image description information of the to-be-processed image may be added manually. Alternatively, the image description information of the to-be-processed image may be acquired by analyzing a page where the to-be-processed image is included or by analyzing similar images.

In an embodiment, the first device 1 may be configured to acquire one or more to-be-processed images from one or more pages. In addition, the first device 1 may be configured to determine the image description information of each of the one or more to-be-processed images according to page information corresponding to each of the one or more to-be-processed images.

In detail, the first device 1 may be configured to crawl or grab one or more pages to obtain various images included in the one or more pages as the one or more to-be-processed images. The one or more pages include webpages, or other pages that are not webpages, such as text documents.

In an embodiment, the first device 1 may be configured to crawl a corresponding webpage on Internet according to a crawling range specified by the user or system and to acquire images included on the webpages as the to-be-processed images. The crawling range may be determined according to at least one of following crawling parameters: crawling time, crawling subject, crawling depth, crawling scope and the like.

The first device 1 is configured to determine text content information included in text information as the image description information of the to-be-processed image, according to the text information corresponding to the to-be-processed image. Alternatively, the first device 1 is configured to determine a position of the to-be-processed image on the page, and to determine text content information near the position of the to-be-processed image as the image description information of the to-be-processed image. Alternatively, the first device 1 is configured to, according to page label information of a page where the to-be-processed image is included, acquire text information determined by a label corresponding to the to-be-processed image as the image description information of the to-be-processed image though a label description, such as "image description", "description" or the like.

The page information includes, but is not limited to, format label (such as HTML format label), illustrative text, page content or the like.

Figure 9:
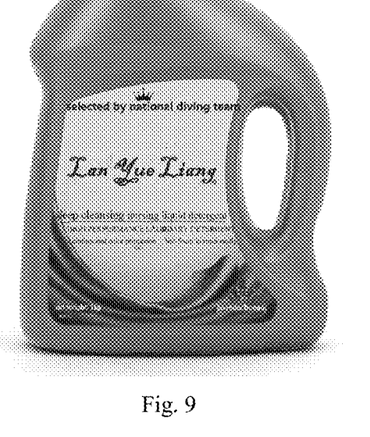
FIG. 9 illustrates an exemplary diagram of a trademark image including text and corresponding text description according to another exemplary embodiment of the present disclosure.

For example, taking a picture such as "Lan Yue Liang deep cleansing liquid detergent 1 kg lavender incense" (illustrated as FIG. 9) displayed on a webpage of JD website as an example After the picture is acquired by crawling the webpage, the content of "product description" displayed on the webpage is determined as the image description information. That is, the image description information includes the followings.

"Brand: Lan Yue Liang

Product Name: Lan Yue Liang Deep Cleansing Liquid Detergent

Product Serial number: 231406

Product Gross weight: 1.1 kg

Place of origin: Guangzhou

Cloth material: cotton, hemp, fiber, silk, woolen, down

Efficacy: decontamination/stain-reduction

Type: machine-washing

Net content: 1 L-1.49 L

Category: liquid detergent

Applicable clothes: lingerie, infant & mom clothes, normal clothes

Package unit: bottled"

In an embodiment, the first device 1 may be configured to acquire one or more to-be-processed images, and to determine one or more similar images corresponding to the to-be-processed images according to the to-be-processed images. In addition, the first device 1 may be configured to determine the image description information of the to-be-processed images according to the image description information corresponding to the one or more similar images.

In detail, the first device 1 is configured to directly interact with the user device, to acquire several images uploaded by the user device, and determine the several images acquired as the to-be-processed images. Alternatively, the first device 1 is configured to interact with an existing image database to acquire several images from the image database. The images acquired are determined as the to-be-processed images. Alternatively, the first device 1 may be configured to crawl various webpage on Internet to acquire images included on the webpage. The images acquired are determined as the to-be-processed images.

The first device 1 is configured to analyze the to-be-processed image to determine the image feature of the to-be-processed image. The first device 1 is configured to compare the image feature of the to-be-processed image with image feature information of one or more other to-be-processed images or other images (such as images included in other database, or other webpage images), to acquire the one or more similar images corresponding to the to-be-processed image.

The first device 1 is configured to determine the image description information of the one or more similar images as the image description information of the to-be-processed image according to the image description information of the similar images. Alternatively, when the to-be-processed image corresponds to several similar images, the first device 1 is configured to determine image description information that is same for the several similar images or image description information that is same for a certain number of similar images as the image description information of the to-be-processed image. The certain number is greater than a threshold value. A method for acquiring the image description information of the similar images is same or similar to the method for determining the image description information of the to-be-processed image described in the exemplary embodiment of the first device 1, which is not elaborated herein.

The second device 2 is configured to determine the trademark feature information corresponding to the to-be-processed image.

In detail, the second device 2 is configured to determine the image features corresponding to the to-be-processed image by analyzing the image features corresponding to the to-be-processed image. In addition, the second device 2 is also configured to compare the image feature with the trademark feature information included in the trademark database. For example, by calculating a vector distance between the image features of the to-be-processed image and the image feature information included in the trademark feature information, the trademark feature information having a shortest vector distance is determined as the trademark feature information corresponding to the to-be-processed image.

In an embodiment, the second device 2 may be configured to perform object detection on the to-be-processed image, to determine a trademark position on the to-be-processed image. In addition, the second device 2 is configured to determine the trademark feature information corresponding to the trademark position.

In detail, the second device 2 is configured to perform the object detection on the to-be-processed image using a method based on for example common object detection algorithm fast RCNN training model, to determine the trademark position on the to-be-processed image. Taking FIG. 9 as an example, the trademark position is the central position where "Lan Yue Liang" is located.

The second device 2 is configured to analyze a portion of the image corresponding to the trademark position based on the above-mentioned method for determining the trademark feature information, to determine the trademark feature information corresponding to the trademark position. Therefore, the second device 2 may be configured to analyze only the portion of the image at the trademark position, reducing image data required to be processed.

The third device 3 is configured to determine trademark text information corresponding to the trademark feature information corresponding to the to-be-processed image as text data of the trademark image corresponding to the to-be-processed image, according to the one or more mappings in the trademark database, when the trademark description information corresponding to the trademark feature information is contained in the image description information corresponding to the to-be-processed image.

In detail, the third device 3 is configured to search the trademark description information corresponding to the trademark feature information from the image description information corresponding to the to-be-processed image according to the mappings stored in the trademark database. If the trademark description information corresponding to the trademark feature information is found, it is illustrated that the identification of the to-be-processed image is precise, such that the trademark text information corresponding to the trademark feature information is directly determined as the text data of the trademark image corresponding to the to-be-processed image.

Taking FIG. 6 as an example, an image is acquired by the first device 1 and image description information corresponding to the image is "product name: LEGO 10698". The second device 2 is configured to determine the trademark feature information of the image and to determine the trademark feature information as "trademark category 8532" illustrated in FIG. 10. The third device 3 is configured to search "LEGO" included in the trademark description information of "trademark name: LEGO" from the image description information of the image, to determine that the image description information includes "LEGO". Therefore, the third device 3 is configured to determine "trademark text content: LEGO" displayed in FIG. 10 as the text data of the trademark image of FIG. 6.

Here, when no trademark text information corresponds to the trademark feature information corresponding to the to-be-processed image, it is illustrated that the to-be-processed image is a trademark without trademark text. Therefore, no corresponding text data is included.

Figure 8:
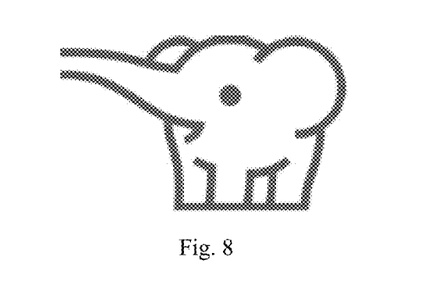

FIGS. 7 and 8 illustrate schematic diagrams of a trademark without trademark text. As can be seen according to FIG. 10, the "trademark text content" of this type of trademark is "NULL". That is, there is no text data corresponding to the to-be-processed image.

In an embodiment, the third device 3 may be configured to determine the trademark text information corresponding to the trademark feature information as the text data of the trademark image corresponding to the trademark position on the to-be-processed image according to the one or more mappings in the trademark database, when the trademark description information corresponding to the trademark feature information is contained in the image description information corresponding to the to-be-processed image.

In detail, the third device 3 is configured to determine a position of text data as positional data of the trademark image corresponding to the trademark position of the to-be-processed when determining the text data. That is, the position of the text data corresponds to a certain position on the to-be-processed image.

As illustrated in FIG. 11, the text data "Lan Yue Liang" is located at a central trademark position of the image. Further, the third device 3 is further configured to output the words "Lan Yue Liang" on a certain position of the to-be-processed image.

Figure 2:
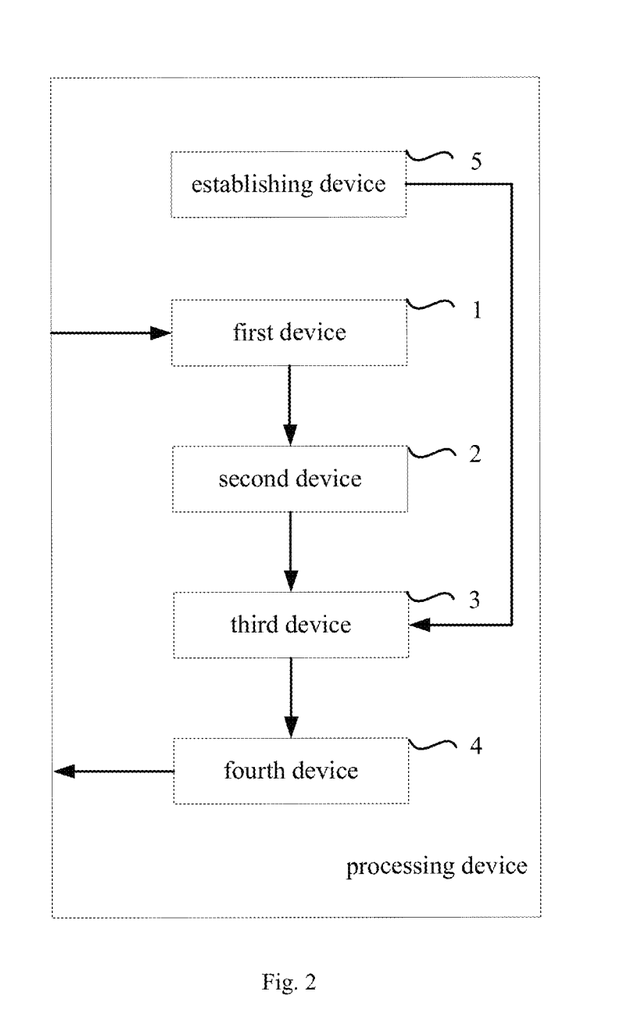
FIG. 2 illustrates a schematic diagram of a processing device for acquiring text data of a trademark image according to an exemplary embodiment of the present disclosure.

FIG. 2 illustrates a schematic diagram of a processing device for acquiring a trademark image according to an exemplary embodiment of the present disclosure. The processing device includes an establishing device 5, a first device 1, a second device 2, a third device 3 and a fourth device 4.

In detail, the establishing device 5 is configured to establish a trademark database. The trademark database includes one or more mappings among trademark feature information, trademark description information and trademark text information. The first device 1 is configured to acquire a to-be-processed image. The to-be-processed image includes image description information. The second device 2 is configured to determine trademark feature information corresponding to the to-be-processed image. The third device 3 is configured to determine trademark text information corresponding to the trademark feature information corresponding to the to-be-processed image as text data of the trademark image corresponding to the to-be-processed image according to the one or more mappings in the trademark database, when trademark description information corresponding to the trademark feature information corresponding to the to-be-processed image is contained in the image description information. The fourth device 4 is configured to determine the trademark image corresponding to the to-be-processed image and the text data corresponding to the trademark image as training data.

The first device 1, the second device 2, the third device 3 and the establishing device 5 are same or similar to those illustrated in FIG. 1, which are not elaborated herein and the descriptions made to FIG. 1 are incorporated here.

The fourth device 4 is configured to determine the trademark image corresponding to the to-be-processed image and the text data corresponding to the trademark image as the training data.

In detail, the fourth device 4 is configured to pick the trademark image corresponding to the to-be-processed image from the to-be-processed image, and to map the trademark image to the text data. In addition, the fourth device 4 is configured to determine the text data and the trademark image as the training data.

In an embodiment, the fourth device 4 may be configured to disturb the trademark image to obtain one or more deformed images. The fourth device 4 is configured to map the text data to the trademark image and the deformed image, to determine the training data.

Here, a manner of disturbing includes, but is not limited to, rotation, blurring, color-inversion, extension and contraction, noising and the like.

Those skilled in the art should understand that, the above manner of disturbing may be individually implemented, or may be implemented in combination. For example, an original image is rotated and is extended or contracted, to obtain the deformed image.

In an embodiment, only when the text data of the trademark image corresponding to the to-be-processed image is a nonempty set, the fourth device 4 is configured to determine the trademark image corresponding to the to-be-processed image and the text data corresponding to the trademark image as the training data.

Figure 10:
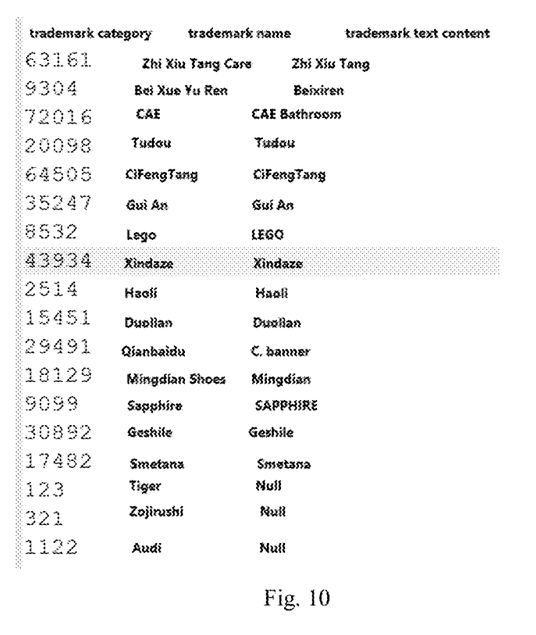
FIG. 10 illustrates a schematic diagram of a storage relation in a trademark database according to an exemplary embodiment of the present disclosure.

In detail, when the text data of the trademark image (such as the trademark image illustrated in FIG. 7 or 8) corresponding to the to-be-processed image is an empty set, for example when the "trademark text content" corresponding to "Tiger, Zojirushi, Audi" illustrated in FIG. 10 is empty, it is indicated that the trademark image does not include the text data. Therefore, the trademark images are filtered from the training data.

Only when the text data of the trademark image (such as the trademark image illustrated in FIG. 5 or 6) corresponding to the to-be-processed image is a nonempty set, the fourth device 4 is configured to determine the trademark image corresponding to the to-be-processed image and the text data corresponding to the trademark image as the training data.

Here, the method of acquiring the training data by the fourth device 4 is same with the descriptions above, which is not elaborated herein.

Figure 3:
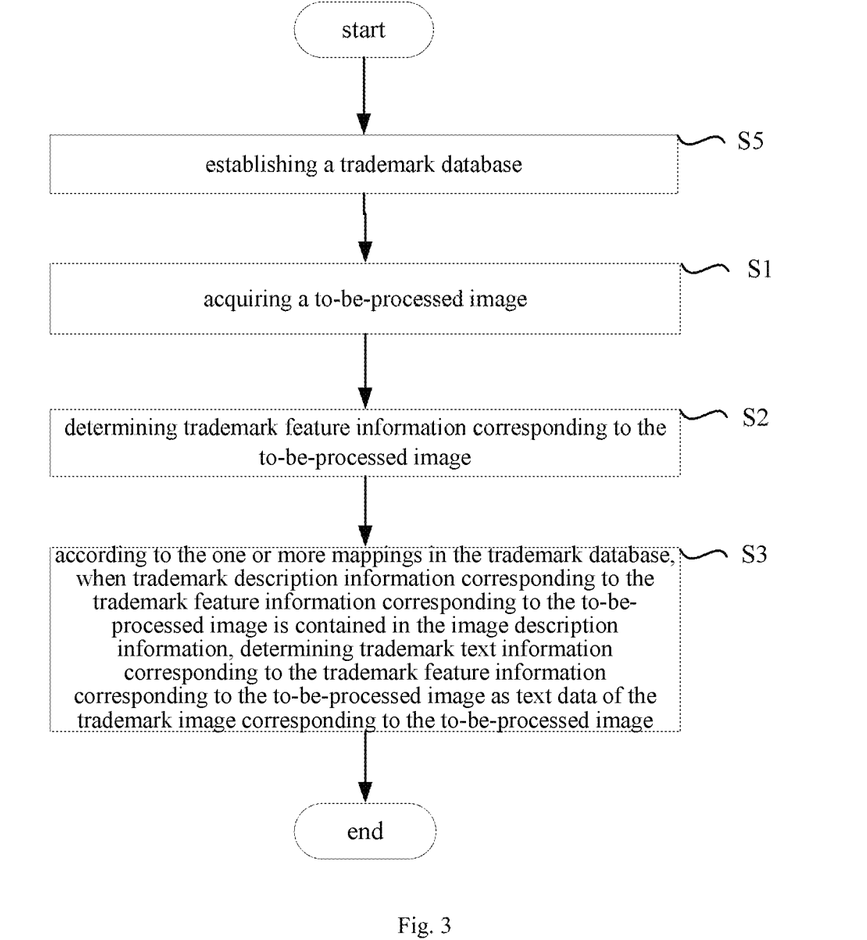
FIG. 3 illustrates a flow chart of a method for acquiring text data of a trademark image according to another aspect of the present disclosure.

FIG. 3 is a flow chart illustrating a method for acquiring text data of a trademark image according to another aspect of the present disclosure.

In detail, in block S5, the processing device is configured to establish the trademark database. The trademark database includes one or more mappings among trademark feature information, trademark description information and trademark text information. In block S1, the processing device is configured to acquire a to-be-processed image. The to-be-processed image includes image description information. In block S2, the processing device is configured to determine trademark feature information corresponding to the to-be-processed image. In block S3, the processing device is configured to, according to the one or more mappings in the trademark database, when trademark description information corresponding to the trademark feature information corresponding to the to-be-processed image is contained in the image description information, determine trademark text information corresponding to the trademark feature information corresponding to the to-be-processed image as text data of the trademark image corresponding to the to-be-processed image.

In block S5, the processing device is configured to establish the trademark database. The trademark database includes one or more mappings among trademark feature information, trademark description information and trademark text information.

In detail, in block S5, the processing device is configured to acquire one or more trademark images set in advance directly or in an interactive manner with another third-part database. The processing device is further configured to acquire the trademark description information and the trademark text information corresponding to the trademark image. In addition, the processing device is configured to perform an image feature analysis on the trademark image to acquire the trademark feature information corresponding to the trademark image.

The trademark feature information may directly correspond to a group of image feature data, such as image vectors and the like. The one or more mappings included in the trademark database are thus among "trademark feature information (image feature data), trademark description information, trademark text information". The trademark feature information may also be correspondences between a group of image feature data and image feature ID (or called as trademark category). The image feature ID may be subsequently stored in the trademark database. That is, the one or more mappings included in the trademark database are among "trademark feature information (image feature ID, corresponding to the image feature data), trademark description information, trademark text information", for convenience of subsequently searching.

The image feature information includes, but is not limited to, color feature, textural feature, shape feature, spatial relation feature and the like.

The trademark description information refers to descriptions made to the trademark, including but not limited to, trademark name, company corresponding to the trademark, product corresponding to the trademark and the like. The trademark text information refers to text contained on the trademark image.

FIG. 6 illustrates a trademark image. As can be seen with reference to data illustrated in FIG. 10, the trademark category corresponding to the trademark feature information of the trademark image is 8532 (i.e., image feature ID), corresponding trademark name is "Lego", and corresponding trademark text information is "LEGO".

Similarly, FIG. 7 illustrates another trademark image. As can be seen with reference to data illustrated in FIG. 10, the trademark category corresponding to the trademark feature information of the trademark image is 123 (i.e., image feature ID), corresponding trademark name is "Tiger", and corresponding trademark text information is "NULL". "NULL" indicates that no trademark text information is contained in the trademark image.

For example, in block S5, the processing device is configured to acquire an image of registered trademark by crawling a website of National Trademark Office, and perform image feature analysis on the image to obtain the image feature information corresponding to the trademark image. The trademark name corresponding to the trademark image is determined as the trademark description information corresponding to the trademark feature information. The text included on the trademark image is determined as the trademark text information. The trademark text information may be manually added, or may be added with correction and confirmation after the image is identified. Therefore, the trademark database is established by the processing device.

In block S1, the processing device is configured to acquire one or more to-be-processed images. The to-be-processed image includes image description information.

In detail, in block S1, the processing device is configured to directly interact with a user device, to acquire several images uploaded via the user device. The several images uploaded are determined as the to-be-processed images. Alternatively, in block S1, the processing device is configured to interact with an existing image database to acquire several images from the existing image database. The several images acquired are determined as the to-be-processed images. Alternatively, in block S1, the processing device may be configured to crawl various webpage on Internet to acquire images included on the webpage. The images acquired are determined as the to-be-processed images.

Herein, those skilled in the art may understand that, the above method for acquiring the to-be-processed images is merely exemplary, and is not used to limit the present disclosure. Any method that may acquire "an image" is applicable to the present disclosure, so as to determine the acquired image as the "to-be-processed image" described in the present disclosure.

Herein, FIG. 11 illustrates an exemplary diagram of a to-be-processed image according to an exemplary embodiment of the present disclosure. The to-be-processed image may be uploaded by the user, or may be acquired from a database, or may be obtained by crawling a webpage on Internet.

The to-be-processed image may include the image description information in the image information. Alternatively, the image description information of the to-be-processed image may be added manually. Alternatively, the image description information of the to-be-processed image may be acquired by analyzing a page where the to-be-processed image is included and by analyzing similar images.

In an embodiment, in block Si, the processing device may be configured to acquire one or more to-be-processed images from one or more pages. In addition, the processing device may be configured to determine the image description information of each of the one or more to-be-processed images according to page information corresponding to each of the one or more to-be-processed images.

In detail, in block S1, the processing device may be configured to crawl or grab one or more pages to obtain various images included in the one or more pages as the one or more to-be-processed images. The one or more pages include webpages, or other pages that are not webpages, such as text documents.

In an embodiment, in block S1, the processing device may be configured to crawl a corresponding webpage on Internet according to a crawling range specified by the user or system and to acquire images included on the webpages as the to-be-processed images. The crawling range may be determined according to at least one of following crawling parameters: crawling time, crawling subject, crawling depth, crawling scope and the like.

The processing device is configured to determine text content information included in the text information as the image description information of the to-be-processed image, according to the text information corresponding to the to-be-processed image. Alternatively, the processing device is configured to determine a position of the to-be-processed image on the page, and to determine text content information near the position of the to-be-processed image as the image description information of the to-be-processed image. Alternatively, the processing device is configured to, according to page label information of a page where the to-be-processed image is included, acquire text information determined by a label corresponding to the to-be-processed image as the image description information of the to-be-processed image though a label description, such as "image description", "description" or the like.

The page information includes, but is not limited to, format label (such as HTML format label), illustrative text, page content or the like.

For example, taking a picture such as "Lan Yue Liang deep cleansing liquid detergent 1 kg lavender incense" (illustrated as FIG. 9) displayed on a webpage of JD website as an example After the picture is acquired by crawling the webpage, the content of "product description" displayed on the webpage is determined as the image description information. That is, the image description information includes the followings.

"Brand: Lan Yue Liang

Product Name: Lan Yue Liang Deep Cleansing Liquid Detergent

Product Serial number: 231406

Product Gross weight: 1.1 kg

Place of origin: Guangzhou

Cloth material: cotton, hemp, fiber, silk, woolen, down

Efficacy: decontamination/stain-reduction

Type: machine-washing

Net content: 1 L-1.49 L

Category: liquid detergent

Applicable clothes: lingerie, infant & mom clothes, normal clothes

Package unit: bottled"

In an embodiment, in block S1, the processing device may be configured to acquire one or more to-be-processed images, and to determine one or more similar images corresponding to the to-be-processed images according to the to-be-processed images. In addition, the processing device may be configured to determine the image description information of the to-be-processed images according to the image description information corresponding to the one or more similar images.

In detail, in block S1, the processing device is configured to directly interact with the user device, to acquire several images uploaded by the user device, and determine the several images acquired as the to-be-processed images. Alternatively, in block S1, the processing device is configured to interact with an existing image database to acquire several images from the image database. The images acquired are determined as the to-be-processed images. Alternatively, in block S1, the processing device may be configured to crawl various webpage on Internet to acquire images included on the webpage. The images acquired are determined as the to-be-processed images.

In block S1, the processing device is configured to analyze the to-be-processed image to determine the image feature of the to-be-processed image. The processing device is configured to compare the image feature of the to-be-processed image with image feature information of one or more other to-be-processed images or other images (such as images included in other database, or other webpage images), to acquire the one or more similar images corresponding to the to-be-processed image.

The processing device is configured to determine the image description information of the one or more similar images as the image description information of the to-be-processed image according to the image description information of the similar images. Alternatively, when the to-be-processed image corresponds to several similar images, the processing device is configured to determine image description information that is same for the several similar images or image description information that is same for a certain number of similar images as the image description information of the to-be-processed image. The certain number is greater than a threshold value. A method for acquiring the image description information of the similar images is same or similar to the method for determining the image description information of the to-be-processed image described in the above exemplary embodiment, which is not elaborated herein.

In block S2, the processing device is configured to determine the trademark feature information corresponding to the to-be-processed image.

In detail, in block S2, the processing device is configured to analyze the image features corresponding to the to-be-processed image, to determine the image features corresponding to the to-be-processed image. In addition, the processing device is also configured to compare the image feature with the trademark feature information included in the trademark database. For example, by calculating a vector distance between the image features of the to-be-processed image and the image feature information included in the trademark feature information, the trademark feature information having a shortest vector distance is determined as the trademark feature information corresponding to the to-be-processed image.

In an embodiment, in block S2, the processing device may be configured to perform object detection on the to-be-processed image, to determine a trademark position on the to-be-processed image. In addition, the processing device is configured to determine the trademark feature information corresponding to the trademark position.

In detail, in block S2, the processing device is configured to perform the object detection on the to-be-processed image using a method based on for example common object detection algorithm fast RCNN training model, to determine the trademark position on the to-be-processed image. Taking FIG. 9 as an example, the trademark position is the central position where "Lan Yue Liang" is located.

The processing device is configured to analyze a portion of the image corresponding to the trademark position based on the above-mentioned method for determining the trademark feature information, to determine the trademark feature information corresponding to the trademark position. Therefore, the processing device may be configured to analyze only the portion of the image located at the trademark position, reducing image data required to be processed.

In block S3, the processing device is configured to determine trademark text information corresponding to the trademark feature information corresponding to the to-be-processed image as text data of the trademark image corresponding to the to-be-processed image, according to the one or more mappings in the trademark database, when the trademark description information corresponding to the trademark feature information is contained in the image description information corresponding to the to-be-processed image.

In detail, in block S3, the processing device is configured to search the trademark description information corresponding to the trademark feature information from the image description information corresponding to the to-be-processed image according to the mappings stored in the trademark database. If the trademark description information corresponding to the trademark feature information is found, it is illustrated that the identification of the to-be-processed image is precise, such that the trademark text information corresponding to the trademark feature information is directly determined as the text data of the trademark image corresponding to the to-be-processed image.

Taking FIG. 6 as an example, in block S1, an image is acquired by the processing device and image description information corresponding to the image is "product name: LEGO 10698". The product name is LEGO 10698. In block S2, the processing device is configured to determine the trademark feature information of the image and to determine the trademark feature information as "trademark category 8532" illustrated in FIG. 10. In block S3, the processing device is configured to search "LEGO" included in the trademark description information of "trademark name: LEGO" from the image description information of the image, to determine that the image description information includes "LEGO". Therefore, the processing device is configured to determine "trademark text content: LEGO" displayed in FIG. 10 as the text data of the trademark image of FIG. 6.

Here, when no trademark text information corresponds to the trademark feature information corresponding to the to-be-processed image, it is illustrated that the to-be-processed image is a trademark without trademark text. Therefore, no corresponding text data is included.

FIGS. 7 and 8 illustrate schematic diagrams of a trademark without trademark text. As can be seen according to FIG. 10, the "trademark text content" of this type of trademark is "NULL". That is, there is no text data corresponding to the to-be-processed image.

In an embodiment, in block S3, the processing device may be configured to determine the trademark text information corresponding to the trademark feature information corresponding to the to-be-processed image as the text data of the trademark image corresponding to the trademark position on the to-be-processed image according to the one or more mappings of the trademark database, when the trademark description information corresponding to the trademark feature information corresponding to the to-be-processed image is contained in the image description information.

In detail, in block S3, the processing device is configured to determine a position of text data as positional data of the trademark image corresponding to the trademark position of the to-be-processed when determining the text data. That is, the position of the text data corresponds to a certain position in the to-be-processed image.

As illustrated in FIG. 11, the text data "Lan Yue Liang" is located at a central trademark position of the image. Further, the processing device is further configured to output the words "Lan Yue Liang" on a certain position of the to-be-processed image.

Figure 4:
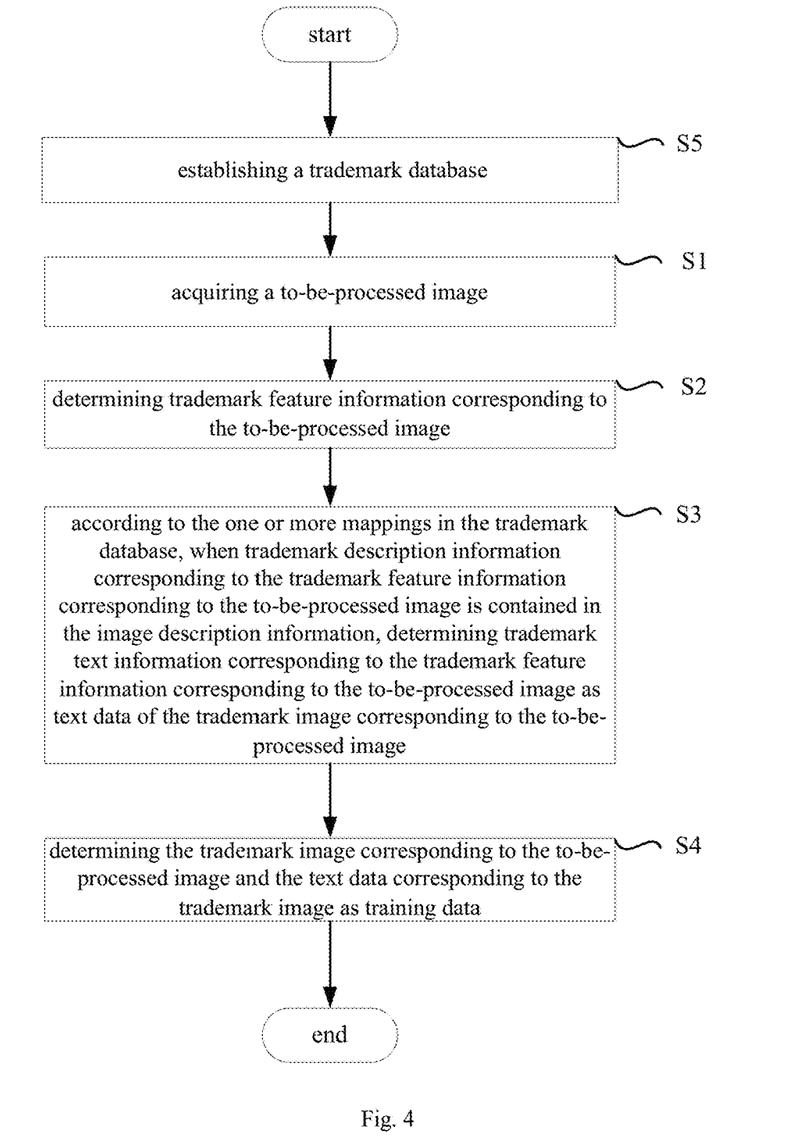
FIG. 4 illustrates a flow chart of a method for acquiring text data of a trademark image according to an exemplary embodiment of the present disclosure.

FIG. 4 is a flow chart illustrating a method for acquiring text data of a trademark image according to an exemplary embodiment of the present disclosure.

In detail, in block S5, the processing device is configured to establish a trademark database. The trademark database includes one or more mappings among trademark feature information, trademark description information and trademark text information corresponding to the trademark feature information. In block S1, the processing device is configured to acquire a to-be-processed image. The to-be-processed image includes image description information. In block S2, the processing device is configured to determine trademark feature information corresponding to the to-be-processed image. In block S3, the processing device is configured to determine trademark text information corresponding to the trademark feature information corresponding to the to-be-processed image as text data of the trademark image corresponding to the to-be-processed image according to the one or more mappings in the trademark database, when trademark description information corresponding to the trademark feature information corresponding to the to-be-processed image is contained in the image description information. In block S4, the fourth device 4 is configured to determine the trademark image corresponding to the to-be-processed image and the text data corresponding to the trademark image as training data.

The block S1, the block S2, the block S3 and the block S5 are same or similar to corresponding blocks in FIG. 3, which are not elaborated herein and the descriptions made to FIG. 3 is incorporated here.

In block S4, the processing device is configured to determine the trademark image corresponding to the to-be-processed image and the text data corresponding to the trademark image as the training data.

In detail, in block S4, the processing device is configured to pick the trademark image corresponding to the to-be-processed image from the to-be-processed image, and to map the trademark image to the text data. In addition, the processing device is configured to determine the text data and the trademark image as the training data.

In an embodiment, in block S4, the processing device may be configured to disturb the trademark image to obtained one or more deformed images. The processing device is configured to map the text data to the trademark image and the deformed image, to determine the training data.

Here, a manner of disturbing includes, but is not limited to, rotation, blurring, color-inversion, extension and contraction, noising and the like.

Those skilled in the art should understand that, the above manner of disturbing may be individually implemented, or may be implemented in combination. For example, an original image is rotated and is extended or contracted, to obtain the deformed image.

In an embodiment, only when the text data of the trademark image corresponding to the to-be-processed image is a nonempty set, the processing device is configured to determine the trademark image corresponding to the to-be-processed image and the text data corresponding to the trademark image as the training data.

In detail, when the text data of the trademark image (such as the trademark image illustrated in FIG. 7 or 8) corresponding to the to-be-processed image is an empty set, for example when the "trademark text content" corresponding to "Tiger, Zojirushi, Audi" illustrated in FIG. 10 is empty, it is indicated that the trademark image does not include the text data. Therefore, the trademark images are filtered from the training data.

Only when the text data of the trademark image (such as the trademark image illustrated in FIG. 5 or 6) corresponding to the to-be-processed image is a nonempty set, the processing device is configured to determine the trademark image corresponding to the to-be-processed image and the text data corresponding to the trademark image as the training data.

Here, the method of acquiring the training data by the processing device is same with descriptions above, which is not elaborated herein.

Embodiments of the present disclosure further provide a computer readable storage medium, having computer codes stored therein. When the computer codes are executed, any one of methods described above is executed.

Embodiments of the present disclosure further provide a computer program product. When the computer program product is executed by a computer device, any one of methods described above is executed.

Embodiments of the present disclosure further provide a computer device. The computer device includes one or more processors, and a memory configured to store one or more computer programs. When the one or more computer programs are executed by the one or more processors, any one of methods described above is realized by the one or more processors.

It should be noted that, the present disclosure can be implemented in software and/or a combination of software and hardware. For example, the present disclosure may be realized using an application specific integrated circuit (ASIC), a general purpose computer, or any other similar hardware device. In one embodiment, the software program of the present disclosure may be executed by a processor to implement the steps or functions described above. Likewise, the software program (including related data structures) of the present disclosure can be stored in a computer readable recording medium such as a RAM memory, a magnetic or optical driver or a floppy disk and the like. Additionally, some steps or functions of the present disclosure may be implemented in hardware, for example, as a circuit cooperating with a processor to perform various steps or functions.

Additionally, a portion of the present disclosure may be applied as a computer program product, such as computer program instructions. When the computer program product is executed by a computer, the method and/or technical solution in accordance with the present disclosure can invoked or provided through operations of the computer. The program instructions for invoking the method of the present disclosure may be stored in a non-removable or removable recording medium and/or transmitted by a data stream in a broadcast or other signal bearing medium, and/or stored in a working memory of the computer device in which the program instructions are running Herein, an embodiment in accordance with the present disclosure includes a device. The device includes a memory for storing computer program instructions and a processor for executing the program instructions. When the computer program instructions are executed by the processor, the methods and/or technical solutions in accordance with various embodiments of the present disclosure is executed by the device.

It is obvious to those skilled in the art that the present disclosure is not limited to details of the above-described exemplary embodiments, and the present disclosure may be embodied in other specific forms without departing from the spirit or essential features of the present disclosure. Therefore, from all aspects, the present embodiments should be considered as illustrative and not restrictive, and the scope of the present disclosure is defined by the appended claims, rather than the above descriptions. Therefore, all changes fallen within the meaning and scope of equivalent elements of claims are included in the present disclosure. Any reference signs in the claims should not be construed as limiting the claims. In addition, it is to be understood that the word "comprising" does not exclude other elements or steps. And singular does not exclude plural. A plurality of units or devices recited in the device claims may also be implemented by one unit or device through software or hardware. The term "first", "second", or the like is used to indicate names and do not indicate any particular order.

What is claimed is:

1. A method for acquiring text data of a trademark image, comprising:
   x, establishing a trademark database, wherein the trademark database comprises one or more mappings among trademark feature information, trademark description information and trademark text information;
   wherein the method further comprises:
   a, acquiring a to-be-processed image from a page, and determining image description information of the to-be-processed image from page information of the page, wherein the image description information comprises text information contained in the page information;
   b, determining trademark feature information corresponding to the to-be-processed image; and
   c, according to the one or more mappings in the trademark database, when trademark description information corresponding to the trademark feature information corresponding to the to-be-processed image is contained in the image description information, determining trademark text information corresponding to the trademark feature information corresponding to the to-be-processed image as text data of the trademark image corresponding to the to-be-processed image.

2. The method according to claim 1, wherein step a further comprises:
   determining one or more similar images corresponding to the to-be-processed image according to the to-be-processed image; and determining the image description information of the to-be-processed image according to the image description information corresponding to the one or more similar images.

3. The method according to claim 1, wherein step b comprises:
performing an object detection on the to-be-processed image, to determine a trademark position on the to-be-processed image; and
determining the trademark feature information corresponding to the trademark position.

4. The method according to claim 3, wherein step c comprises:
according to the one or more mappings in the trademark database, when the trademark description information corresponding to the trademark feature information corresponding to the to-be-processed image is contained in the image description information, determining the trademark text information corresponding to the trademark feature information corresponding to the to-be-processed image as the text data of the trademark image corresponding to the trademark position on the to-be-processed image.

5. The method according to claim 1, further comprising:
r, determining the trademark image corresponding to the to-be-processed image and the text data corresponding to the trademark image as training data.

6. The method according to claim 5, wherein step r comprises:
only when the text data of the trademark image corresponding to the to-be-processed image is a nonempty set, determining the trademark image corresponding to the to-be-processed image and the text data corresponding to the trademark image as the training data.

7. A computer device, comprising:
one or more processors;
a memory, configured to store one or more computer programs;
wherein when the one or more computer programs are executed by the one or more processors, a method for acquiring text data of a trademark image is executed by the one or more processors, the method comprises:
x, establishing a trademark database, wherein the trademark database comprises one or more mappings among trademark feature information, trademark description information and trademark text information;
a, acquiring a to-be-processed image from a page, and determining image description information of the to-be-processed image from page information of the page, wherein the image description information comprises text information contained in the page information;
b, determining trademark feature information corresponding to the to-be-processed image; and
c, according to the one or more mappings in the trademark database, when trademark description information corresponding to the trademark feature information corresponding to the to-be-processed image is contained in the image description information, determining trademark text information corresponding to the trademark feature information corresponding to the to-be-processed image as text data of the trademark image corresponding to the to-be-processed image.

8. The computer device according to claim 7, wherein step a further comprises:
determining one or more similar images corresponding to the to-be-processed image according to the to-be-processed image; and
determining the image description information of the to-be-processed image according to the image description information corresponding to the one or more similar images.

9. The computer device according to claim 7, wherein step b comprises:
performing an object detection on the to-be-processed image, to determine a trademark position on the to-be-processed image; and
determining the trademark feature information corresponding to the trademark position.

10. The computer device according to claim 9, wherein step c comprises:
according to the one or more mappings in the trademark database, when the trademark description information corresponding to the trademark feature information corresponding to the to-be-processed image is contained in the image description information, determining the trademark text information corresponding to the trademark feature information corresponding to the to-be-processed image as the text data of the trademark image corresponding to the trademark position on the to-be-processed image.

11. The computer device according to claim 7, further comprising:
r, determining the trademark image corresponding to the to-be-processed image and the text data corresponding to the trademark image as training data.

12. The computer device according to claim 11, wherein step r comprises:
only when the text data of the trademark image corresponding to the to-be-processed image is a nonempty set, determining the trademark image corresponding to the to-be-processed image and the text data corresponding to the trademark image as the training data.

13. A non-transitory computer readable storage medium, having computer codes stored therein, when the computer codes are executed, a method for acquiring text data of a trademark image is executed, wherein the method includes:
x, establishing a trademark database, wherein the trademark database comprises one or more mappings among trademark feature information, trademark description information and trademark text information;
wherein the method further comprises:
a, acquiring a to-be-processed image from a page, and determining image description information of the to-be-processed image from page information of the page, wherein the image description information comprises text information contained in the page information;
b, determining trademark feature information corresponding to the to-be-processed image; and
c, according to the one or more mappings in the trademark database, when trademark description information corresponding to the trademark feature information corresponding to the to-be-processed image is contained in the image description information, determining trademark text information corresponding to the trademark feature information corresponding to the to-be-processed image as text data of the trademark image corresponding to the to-be-processed image.

14. The non-transitory computer readable storage medium according to claim 13, wherein step a further comprises:

determining one or more similar images corresponding to the to-be-processed image according to the to-be-processed image; and determining the image description information of the to-be-processed image according to the image description information corresponding to the one or more similar images.

15. The non-transitory computer readable storage medium according to claim 13, wherein step b comprises:

performing an object detection on the to-be-processed image, to determine a trademark position on the to-be-processed image; and determining the trademark feature information corresponding to the trademark position.

16. The non-transitory computer readable storage medium according to claim 15, wherein step c comprises:

according to the one or more mappings in the trademark database, when the trademark description information corresponding to the trademark feature information corresponding to the to-be-processed image is contained in the image description information, determining the trademark text information corresponding to the trademark feature information corresponding to the to-be-processed image as the text data of the trademark image corresponding to the trademark position on the to-be-processed image.

17. The non-transitory computer readable storage medium according to claim 13, wherein the method further comprises:

r, determining the trademark image corresponding to the to-be-processed image and the text data corresponding to the trademark image as training data.

* * * * *